W. H. COWELL.
Axle Boxes and Sleeves for Vehicle-Wheels.
No. 141,699. Patented August 12, 1873.
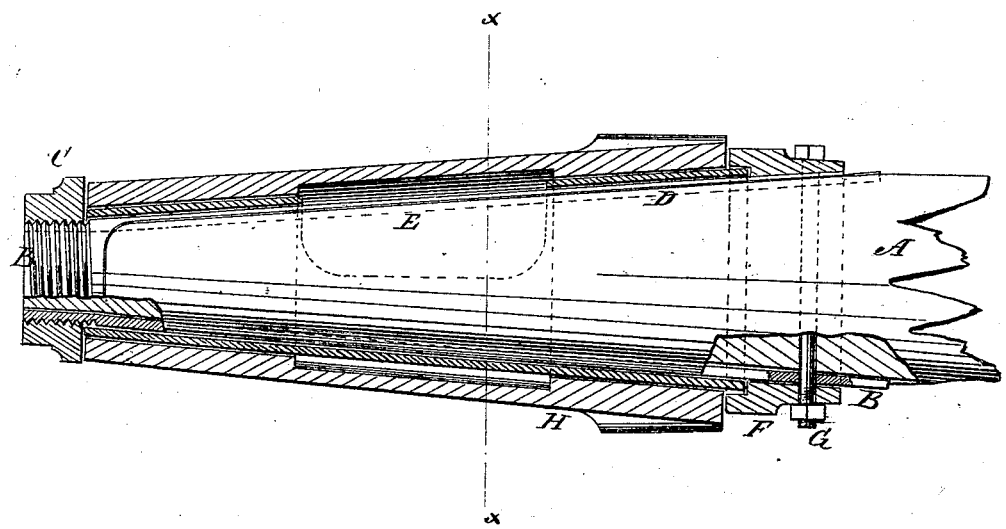
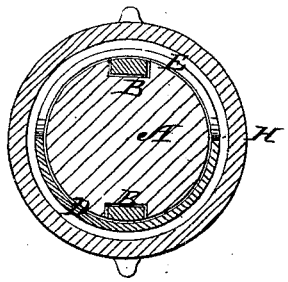
Witnesses:
Inventor:

UNITED STATES PATENT OFFICE.

WILLIAM H. COWELL, OF COLUMBUS, OHIO.

IMPROVEMENT IN AXLE-BOXES AND SLEEVES FOR VEHICLE-WHEELS.

Specification forming part of Letters Patent No. 141,699, dated August 12, 1873; application filed April 19, 1873.

*To all whom it may concern:*

Be it known that I, WILLIAM H. COWELL, of Columbus, in the county of Franklin and State of Ohio, have invented a new and useful Improvement in Wagon-Boxes, of which the following is a specification:

The invention consists in the improvement of axle-spindles, as hereinafter described and pointed out in the claim.

In the accompanying drawing, Figure 1 is a longitudinal section of the whole arrangement. Fig. 2 is a cross-section of Fig. 1 on the line $x\ x$.

Similar letters of reference indicate corresponding parts.

A is the axle, which is made of wood. B represents the skein, which is fitted to the axle in the usual manner. C is the nut on the outer end of the skein. D is the sleeve, which is made of sheet metal and fitted onto the axle over the skein. E is a recess or opening in this sleeve for the retention of the lubricating material. F is a collar, which surrounds the axle, and is fastened in position by a bolt, G, which bolt passes through the axle and skein, as seen in Fig. 1. The inside of the collar is rabbeted to receive the end of the sleeve. H is the pipe-box, which revolves on the sleeve. The box and the sleeve are both confined between the collar and the skein-nut, but the sleeve is confined so that it cannot revolve on the axle.

The interior of the pipe-box is chambered out for containing the lubricating material, and the box is cast on a chill, to render it hard and durable.

The sleeve may be made of hard sheet steel or composition metal, and not being confined, except by a lug or other device, to prevent its revolving with the wheel, it may be turned, when worn, upon one side, thus presenting a new surface for the bearing.

I am aware that a sleeve on the axle beneath the box is not new; such sleeves have been fixed on the axle. I disclaim any sleeve which is fixed, or which cannot be turned on the axle.

Having thus described my invention, I claim as new and desire to secure by Letters Patent—

The recessed sleeve D E and the rabbeted collar F combined with the pipe-box H, adapted to revolving on the sleeve, while the sleeve itself is adapted to revolve on the axle, as and for the purpose described.

W. H. COWELL.

Witnesses:
   T. B. MOSHER,
   ALEX. F. ROBERTS.